United States Patent [19]

Schulze

[11] Patent Number: 4,564,300
[45] Date of Patent: Jan. 14, 1986

[54] BEARING SUPPORT STAND

[75] Inventor: Gerd Schulze, Oberhausen, Fed. Rep. of Germany

[73] Assignee: Deutsche Babcock Aktiengesellschaft, Oberhausen, Fed. Rep. of Germany

[21] Appl. No.: 390,066

[22] Filed: Jun. 18, 1982

Related U.S. Application Data

[60] Continuation of Ser. No. 178,857, Aug. 18, 1980, abandoned, which is a division of Ser. No. 935,740, Aug. 21, 1978, Pat. No. 4,235,483.

[30] Foreign Application Priority Data

Oct. 5, 1977 [DE] Fed. Rep. of Germany ....... 2744697

[51] Int. Cl.⁴ ............................................. F16C 27/00
[52] U.S. Cl. .................................... 384/581; 384/215
[58] Field of Search ............... 384/581, 215, 535, 584, 384/585, 537; 267/160

[56] References Cited

U.S. PATENT DOCUMENTS 1,324,376 12/1919 Bicknell et al. .
2,723,166 11/1955 Gair .
2,987,752 6/1961 Black ................................. 267/160
3,937,538 2/1976 Zimmer et al. ................. 308/207 R Primary Examiner—Lenard A. Footland
Attorney, Agent, or Firm—Max Fogiel

[57] ABSTRACT

A support stand for bearings for rotating shafts in which a supporting plate carries the bearing and rests on a spring. The latter is resilient in the direction of the shaft, and is substantially rigid in a plane perpendicular to the shaft. The supporting plate is parallel to a horizontal plane passing through the shaft. The spring may be in the form of a double spring, and the bearing may be constructed as a single self-aligning roller bearing. When using a single spring in combination with the bearing, a relative movement of the bearing housing exclusively about the shaft axis is obtained. The spring is pre-loaded in the shaft direction, and an auxiliary spring may be supported outside the bearing support stand and pressed in the shaft direction against the stand. A bottom and top spring may be provided and connected by struts. The springs, moreover, may be made of structural iron having a I-profile.

2 Claims, 4 Drawing Figures

BEARING SUPPORT STAND

This is a continuation of application Ser. No. 178,857 filed Aug. 18, 1980, abandoned, which is a division of application Ser. No. 935,740, filed Aug. 21, 1978, now Pat. No. 4,235,483.

BACKGROUND OF THE INVENTION

The present invention relates to a bearing support stand for rotating shafts.

Especially when bearing supports for blowers are involved, such support stands are made as rigidly as possible, and ordinarily of sheet metal construction. The supporting plates for both the fixed and the loose bearing are connected as rigidly as possible to the foundation, or, with machines mounted on shock absorbers, on the common frame. In all axes and planes, even with larger unbalancing forces, only minimum displacements of the supporting plates relative to the foundation or the frame should occur.

Axial forces in the shaft direction only stress the fixed bearing. Thermal expansions of the shaft are absorbed in the loose bearing without appreciable force effects. This would require, however, that the loose bearing is either a sliding bearing without axial restriction or a cylinder roller bearing or needle bearing without rims. Usually, self-aligning roller bearings are used. It is assumed that the loose bearing system is displaced in its housing during thermal expansion of the shaft.

Depending on the ratio of radial load to axial load, with a self-aligning roller bearing, both roller rows carry different portions of the load, with the bottom rollers carrying the most load.

If the loose bearing system is to be displaced axially within the housing, the friction force between outside ring and the housing must be overcome. Hence, displacement requires an axial force which at least equals the calculated friction force. Depending on the friction between outer ring and housing and the degree of swing owing to non-axial symmetrical force distribution of friction force and axial load, one must expect axial loads during displacement of the loose bearing which may increase to whole multiples of the radial load.

An advance calculation of the displacement force is not possible. For blowers with changing shaft temperatures, one must assume that loose and fixed bearings run continuously with axial loads of unknown size because after displacement of the loose bearing outer ring, there will appear an equilibrium between displacement force on the one hand and elastic forces of the bearing and of the substructure on the other hand.

From a vibration analysis viewpoint, the bearings couple the rotor to the support stands and hence also to the frame or to the foundation. With self-aligning roller bearings, the degree of coupling depends largely on the ratio of axial load to radial load. It ranges from relatively loose coupling with pure axially non-loaded loose bearings to relatively rigid coupling with axially overloaded bearings where all rollers of one row are engaged. This results for the overall system rotorsupport stand—foundation in different resonant frequencies which cannot be calculated in advance with sufficient accuracy and which depend on the prevailing axial load and hence also on the shaft temperature.

It is an object of the present invention to avoid these disadvantages and to calculate the forces occurring in the bearing more accurately by a special construction of the bearing support stand.

Another object of the present invention is to provide a bearing support stand of the foregoing character which is substantially simple in construction and may economically fabricated.

A further object of the present invention is to provide an arrangement, as described, which may be easily maintained in service and which has a substantially long service life.

SUMMARY OF THE INVENTION

The objects of the present invention are achieved by having the supporting plate carrying the bearing rest on a spring which is resilient in the shaft direction and quite rigid in the plane perpendicular to the shaft. The supporting plate is located parallel to the horizontal plane passing through the shaft.

This support stand is used for bearings with loose bearing properties while the support stand carrying the fixed bearing is made rigid as was done previously. The bearing system itself should be inserted as fixed bearing in the housing. The loose bearing property is provided solely by the bearing support stand in accordance with the present invention where the axial force can be computed as a function of the displacement. In this manner, all forces, stresses and deformations occurring in the loose bearing can be easily computed and safely controlled. Since there are no unknown or undesirable axial forces due to lengthwise expansion of the shaft, the life of the bearings is not shortened by such forces. Furthermore, the loose bearing system need not be fitted in the housing since it need no longer be displaced.

In an embodiment of the present invention, the spring of the support stand may be pre-loaded in the shaft direction. In this manner, a desired axial load with full expansion of the shaft at operating temperature can be set. If it is desired, the actual fixed bearing can be relieved by producing, via the spring force of the support stand, an artificial axial force which causes the "loose bearing" to share in carrying the axial load coming from the rotor. The same can be achieved if, in accordance with another embodiment, an extra spring supported outside the support stand is pressed against the support stand in the shaft direction. Thus precisely determinable additional axial forces can be applied via the "loose bearing" to the rotor.

Depending on the type of bearing, the spring is a double spring or a single spring. Double spring construction is used when the bearing is a single self-aligning roller bearing. The struts of the support stand may constitute this double spring. In this case, the double spring provides for parallel guidance of the supporting plates carrying the bearing.

The present invention uses a single spring if the bearing or the bearing combination permits a relative movement of the bearing housing exclusively about the shaft axis. This arrangement may be used for sliding bearings and roller bearings or roller bearing combinations with shaft guidance character. The parallel guidance of the supporting plates is provided by the bearing(s).

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
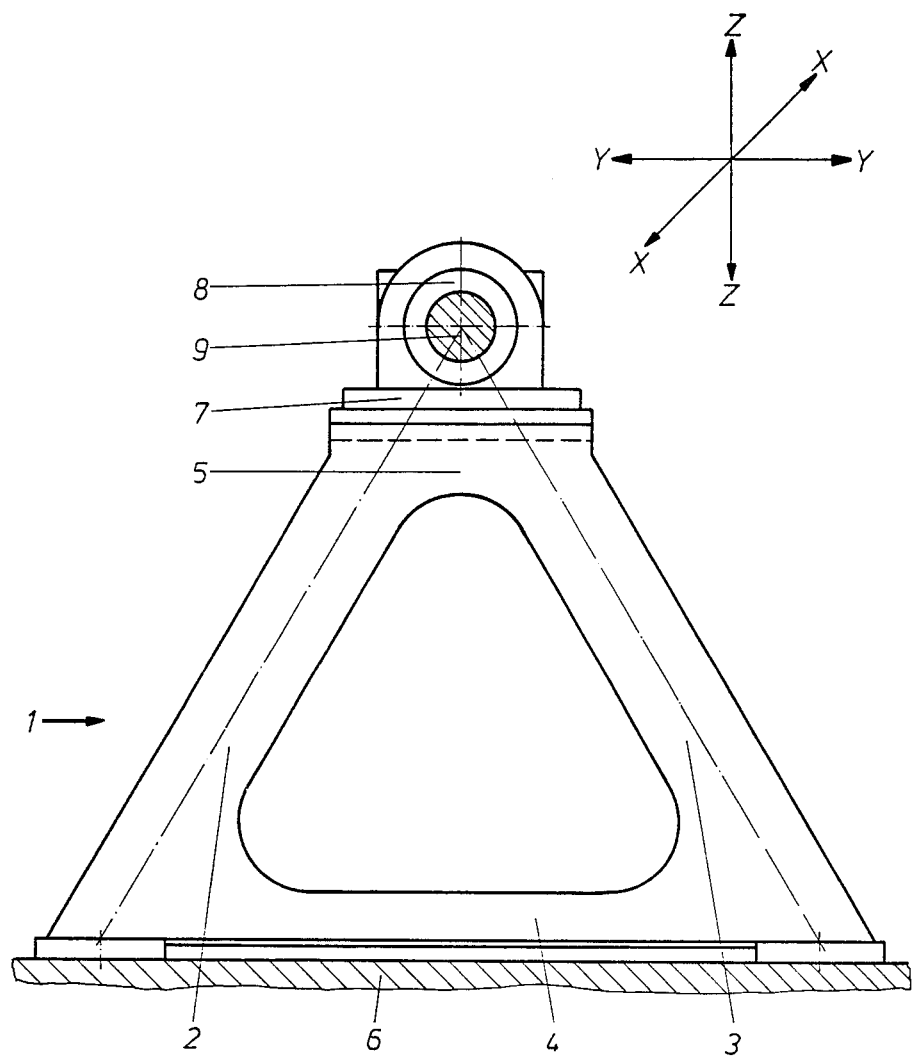
FIG. 1 shows a frontal view of a support stand in accordance with the present invention.

The support stand 1 consists of two inclined struts 2 and 3 which are connected by an upper and a lower cross connection 4 and 5. It rests on foundation 6. The centroidal axes of struts 2 and 3 intersect in the shaft axis in order to avoid moment loads on struts 2, 3. Unbalancing forces rotating about the shaft axis can, in this case, produce only pure tensile or compressive loads in struts 2, 3.

The support stand 1 carries a supporting plate 7 which holds the bearing 8, in this case a simple self-aligning roller bearing in which the shaft of a blower rotates.

Figures 2, 4:
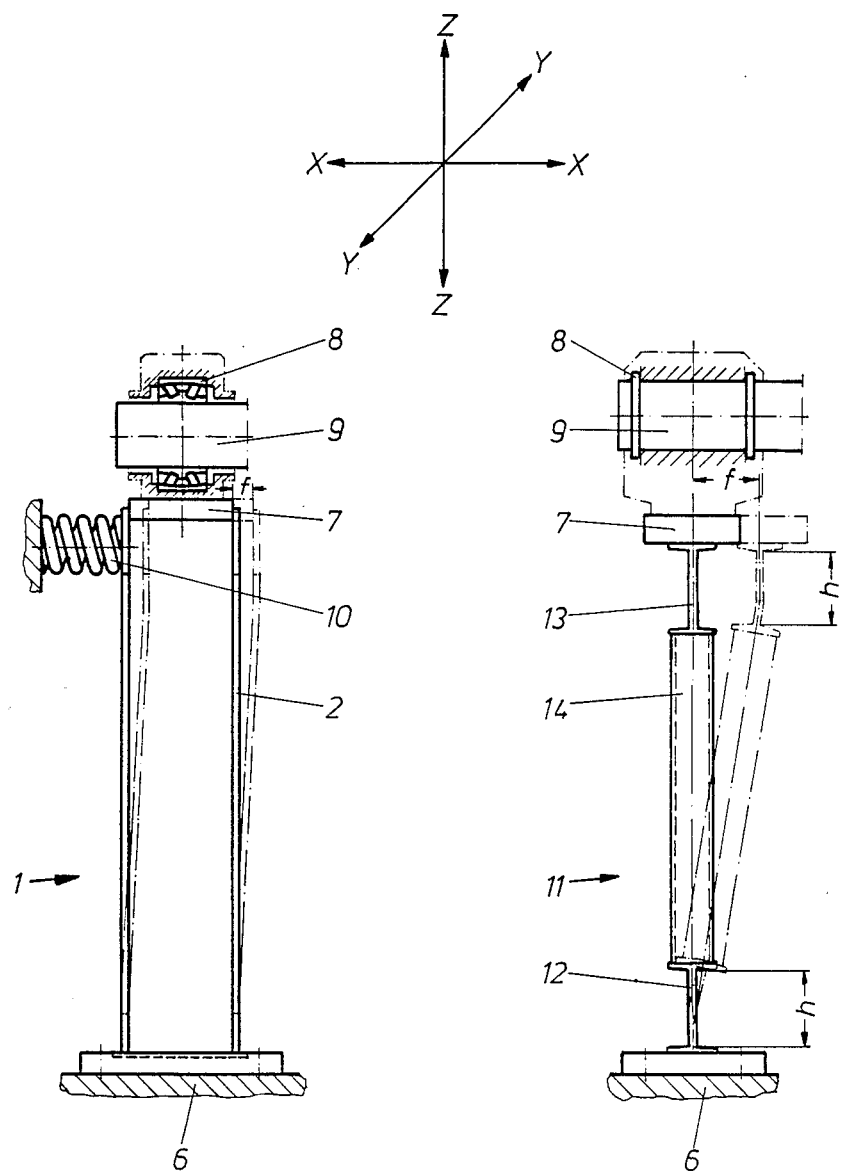
FIG. 2 shows the associated side view of FIG. 1.
FIG. 4 shows the side view of the embodiment of FIG. 3.

The support stand 1 is constructed as a double spring and has in the shaft direction (direction X—X) a great resilience with sufficient rigidity in the plain perpendicular to the shaft direction (plane Y-Z). The spring action of support stand 1 by no means requires the use of spring steel for the struts 2 and 3. Any material may be used as a spring if the tension remains in the elastic range. The change in shape produced in the support stand by elastic deformation is indicated in FIG. 2 by the dot-dash lines. The supporting plate 7 is displaced in the X-Y plane parallel to the X-direction (shaft direction). The amount of axial force can be calculated as a function of the displacement f. The bearing 8 itself is a fixed bearing since the loose-bearing property is supplied in the required manner by the elastic support frame 1.

The support frame 1 can be already pre-loaded during assembly in the X-direction. Instead of a pre-load, an outside supported extra spring 10 may act on the support frame.

Figure 3:
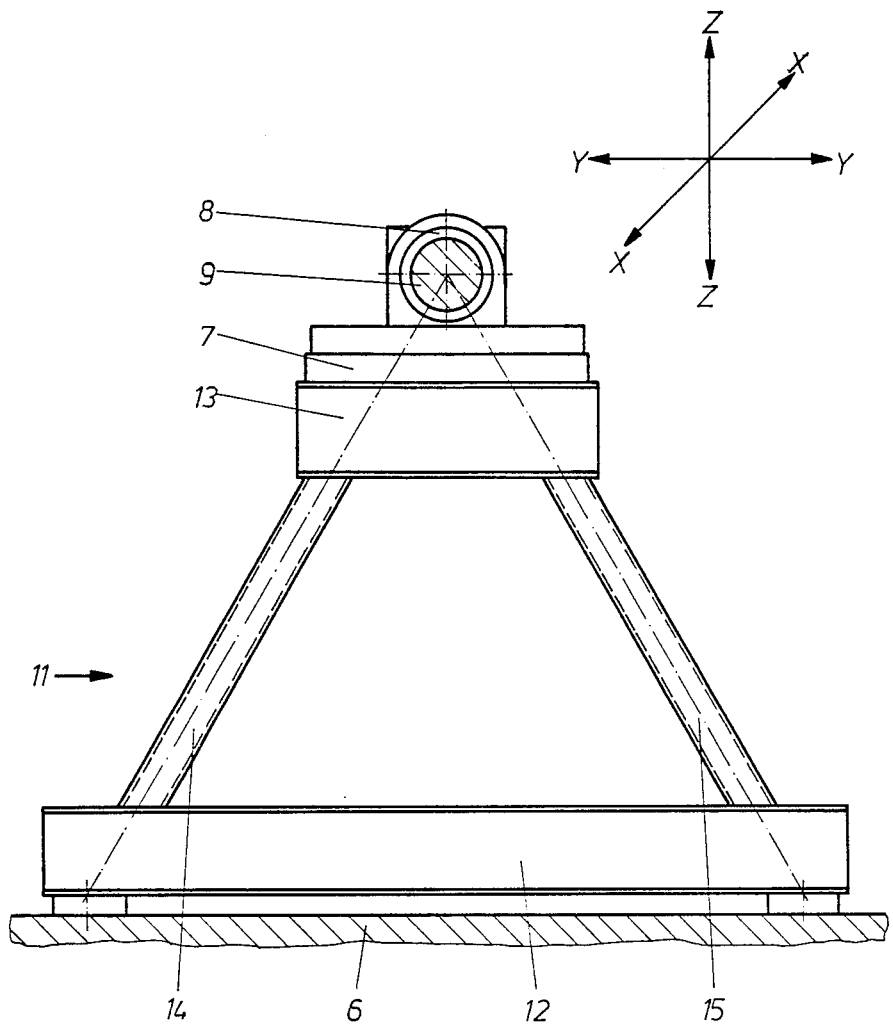
FIG. 3 shows another embodiment of a support stand.

The support frame 11, shown in FIGS. 3 and 4, is suitable for the holding of (a) sliding bearings and (b) roller bearings or roller bearing combinations with shaft guide properties. Bearing 8, shown in FIG. 4 and enclosing shaft 9, has the form of a sliding bearing. It is used, as are all bearings described here, as a fixed bearing. The elastic property of this support frame 11 is obtained by two single springs (bottom spring 12 and top spring 13). The springs 12, 13 are connected by two non-elastic struts 14 and 15, made, for example, of pipes, whose centroidal axes intersect in the shaft axis. The top spring 13 holds the supporting plate 7 while the support stand 11 is supported via the bottom spring 12 on the foundation 6. Instead of the two single springs 12, 13 connected to struts 14, 15, a continuous single spring may be used.

The top spring 13 and the bottom spring 14 are resilient in the shaft direction (X-direction). Both springs consist of I-profile iron. The parallel guidance of the supporting plate 7 is provided by the bearing 8 itself. The change in shape, caused by elastic deformation, of support frame 11 is indicated in FIG. 4. Bottom and top springs 12 and 13 each constitute a buckling rod whose buckling length equals height h.

The special advantage of the support stand 11 for use with sliding bearings is that, in spite of very simple installation, no unacceptable end pressures can occur even with long bearing boxes. Ball mobility of the bearing boxes in the housing can be dispensed with. The sliding bearing conforms to the shaft. This is an advantage especially with blowers for high temperatures where the shaft axis is displaced because of the elasticity modulus decreasing with high temperatures. When dimensioning springs 12 and 13, it is necessary to consider that the supporting plate 7 has a certain torsional resilience in plane X-Y in order to ensure conformance of bearing 8 to shaft 9 in this horizontal plane also.

The bearing 8 may also be formed by two self-aligning roller bearings in separate standard housings or in a common special housing. The special advantage is that the bearing load is distributed over two bearings which for this reason may have smaller dimensions. This results in a larger distance from the maximum speeds of the bearings and hence a more frequent possibility of using self-lubricating bearings.

In addition to the bearings described for use with single springs for the support stand, grooved ball bearings or double bevel ball bearings may be used.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A bearing support stand for a rotating shaft comprising: a supporting plate; bearing means being carried by said supporting plate; said bearing means being arranged for providing relative movement of a housing of said bearing means exclusively about the axis of said shaft; spring means resilient in the direction of said shaft and substantially rigid in a plane perpendicular to said shaft; said supporting plate resting on said spring means; said supporting plate being parallel to a horizontal plane passing through said shaft; said spring means comprising a single spring; said plate being guided parallel to a horizontal plane intersecting said shaft upon deformation of said spring means, said bearing means being substantially rigidly fixed in direction perpendicular to the shaft, said shaft being held rigidly in direction of a load, said bearing means being supported by said spring means at the point of application of the load; said spring means comprising a bottom spring and a top spring; strut means connecting said bottom spring and said top spring; said springs being comprised of structural iron having an I-profile.

2. A bearing support stand for a rotating shaft comprising: a supporting plate; bearing means being carried by said supporting plate; said bearing means being arranged for providing relative movement of a housing of said bearing means exclusively about the axis of said shaft; spring means resilient in the direction of said shaft and substantially rigid in a plane perpendicular to said shaft; said supporting plate resting on said spring means; said supporting plate being parallel to a horizontal plane passing through said shaft; said spring means comprising a single spring; said plate being guided parallel to a horizontal plane intersecting said shaft upon deformation of said spring means, said bearing means being substantially rigidly fixed in direction perpendicular to the shaft, said shaft being held rigidly in direction of a load, said bearing means being supported by said spring means at the point of application of the load; said spring means comprising a single spring and said bearing means permitting relative movement of a housing of said bearing means exclusively about the shaft axis, said spring being pre-loaded in the shaft direction; auxiliary spring means supported outside said support stand and pressed against said support stand in the shaft direction; said spring having a bottom spring element and a top spring element; strut means connecting said bottom spring element and said top spring element; said bottom spring element and said top spring element being comprised of structural iron having an I-profile.

* * * * *